United States Patent [19]
Laemthongsawad

[11] Patent Number: 5,755,553
[45] Date of Patent: May 26, 1998

[54] WATER TURBINE

[76] Inventor: Prasert Laemthongsawad, No. 48 Moo 6, Sridongyen Sub-District, Chaiprakarn District, Chiangmai Province, Thailand

[21] Appl. No.: 758,913

[22] Filed: Dec. 2, 1996

Related U.S. Application Data

[63] Continuation of Ser. No. 327,463, Oct. 21, 1994, abandoned.

[51] Int. Cl.$^6$ .................................................. F03B 1/02
[52] U.S. Cl. .................. 415/3.1; 415/4.1; 415/92; 415/117; 415/202; 60/398; 290/54
[58] Field of Search ............................ 415/3.1, 4.1, 6, 415/92, 117, 183, 202, 906, 916; 416/178; 60/398; 290/42, 43, 54

[56] References Cited

U.S. PATENT DOCUMENTS 1,441,955  1/1923  Walker ..................... 415/3.1

FOREIGN PATENT DOCUMENTS

| | | | |
|---|---|---|---|
| 0500360 | 1/1951 | Belgium | 60/398 |
| 1202545 | 4/1986 | Canada | 415/6 |
| 4888 | of 1831 | France | 415/202 |
| 405 | of 1857 | Italy | 415/202 |
| 2850 | of 1874 | United Kingdom | 415/202 |
| 451 | of 1878 | United Kingdom | 415/916 |
| 23142 | of 1899 | United Kingdom | 415/202 |

*Primary Examiner*—Christopher Verdier
*Attorney, Agent, or Firm*—Schweitzer Cornman Gross & Bondell LLP

[57] ABSTRACT

An improved water turbine apparatus includes a rotating waterwheel having a plurality of water-receiving buckets arranged about its periphery. Water is delivered to the buckets at a first, upper location and drained from the buckets at a second, lower location. The water is retained in the buckets during rotation between the first and second locations by a curved, fixed turbine wall. A portion of the water delivered to the buckets may be pumped from a well or reservoir, the water drained from the buckets being used to replenish the reservoir. The reservoir can be used to augment a second, variable water source to maintain continuous and consistent turbine output.

6 Claims, 2 Drawing Sheets

5,755,553

1

WATER TURBINE

This is a continuing application of U.S. Ser. No. 08/327,463, filed on Oct. 21, 1994, now abandoned.

The present invention relates to a new and improved form of water turbine.

BACKGROUND OF THE INVENTION

The use of a waterwheel or turbine to provide mechanical ower, such as for electrical generation or otherwise, is well known. Typically, water from a canal, reservoir or other natural waterway is used to fill a series of receptacles formed between a series of blades or vanes of a wheel-like structure. Imbalance resulting from the fill causes the wheel to rotate about its drive shaft, generating rotational force which may be coupled to other devices. The water is drained from the receptacles at a low point of rotation.

When driven by natural water sources, the quantity of water available to drive a turbine is often uncertain, dependent upon the changing seasons and varying climatic conditions. During a rainy season the amount and flow of water present may be too great for the turbine. Conversely, in a time of less rain fall or little water, insufficient water flow may be present for turbine operation. While man-made reservoirs and viaducts are often constructed to provide a constant water flow, it is well recognized that such installations often require expenditures of a great deal of funds, and further may not be feasible due to the geographic and climatic conditions associated with the desired location for the turbine. They further generally represent large-scale construction, and thus are impractical for water turbines of small or moderate capacity.

It is a purpose of the present invention to provide a water turbine which operates successfully on a reduced quantity of water flow, and thus is well adapted to use in locations where conventional turbine structures would be non-operative.

A further purpose of the present invention is to provide a water turbine which can be driven both by natural and man-made sources to allow a consistent output to be maintained, irrespective of variations in the flow of the natural water supply.

BRIEF DESCRIPTION OF THE INVENTION

The present invention comprehends a new and improved water turbine or waterwheel wherein a plurality of water-capturing buckets are provided about the periphery of the wheel. The buckets may be of trapezoidal shape with a large entranceway. The frame of the turbine includes a housing which serves to seal the buckets' entranceways and retain the water in the buckets as they rotate from a fill point to a drain point, thus maximizing the mass imbalance between filled and empty buckets and maximizing the rotational force attained by the wheel. The housing has apertures allowing the water fill into, and to drain from, the buckets. In a disclosed embodiment, a natural source of water may be augmented by a well or reservoir. A pump apparatus is employed to transmit the stored water to the top of the turbine wheel, thus assisting a natural flow as may be required to maintain continuous and consistent wheel rotation.

BRIEF DESCRIPTION OF THE DRAWINGS

A fuller understanding of the present invention and the features and benefits thereof will be accomplished upon review of the following description of a preferred, but nonetheless illustrative embodiment thereof, when reviewed in connection with the annexed Figures, wherein.

DETAILED DESCRIPTION OF THE INVENTION

Figure 1:
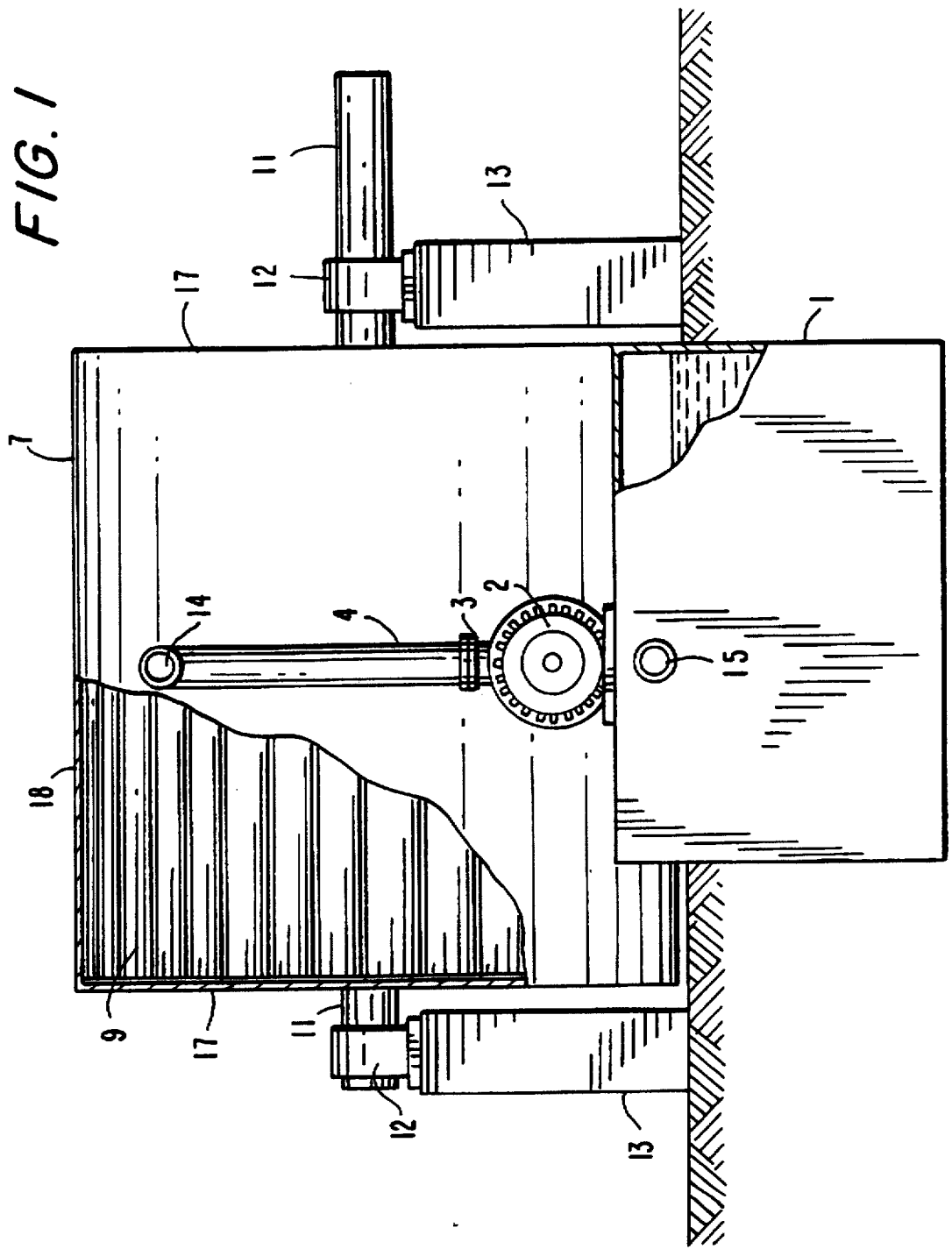
FIG. 1 is an end view in elevation, partially broken away, depicting an embodiment of the invention.

With reference to the Figures, the water turbine or wheel of the present invention includes a pair of spaced upright frame members 13 which support a pair of bearings 12 upon which the waterwheel shaft 11 is mounted for rotation. As known in the art, rotational energy is developed about the shaft 11 which is coupled to appropriate machines for useful work. Mounted to the shaft 11 by radial arms 19 is the water collection portion of the apparatus, which comprises a plurality of wells or buckets 9 in a circular array into which the water 10 is directed. The water fills the buckets through an entryway 21 located at the top of the wheel, and drains from the buckets through exitway 22 located at the bottom of the wheel. The unbalanced mass of the waterwheel and collected water, shown in FIG. 2 as being of greater mass on the right side of the wheel, causes a rotation of the wheel about the shaft 11.

The water is led to the waterwheel and entryway 21 by a pipe 4, and the drained water from exitway 22 is collected from the waterwheel by a pipe 6.

As further illustrated in the drawings, water for operation of the wheel or turbine may be provided from a well or reservoir 1, so located as to collect at least a portion of the drained water in pipe 6. The water in the well or reservoir is removed through draw pipe 5, which is coupled to the input port of a pump 3. The output port of pump 3 is coupled to pipe 4, which leads to the turbine's water entryway 21. The pump may be operated by an electric motor 2.

It is of course to be recognized that the drive water for the turbine may be provided by another source, such as through a line 14, coupled to pipe 4 as shown. Such additional and alternative source may provide the primary drive for the waterwheel, the motor and pump being engaged to provide additional water as required to maintain the desired rotation and thus energy and work output from the waterwheel system. It is intended that such source may be a natural water source, whose flows may be erratic and thus requiring of supplementation by the pumped water. The well 1 may be provided with a suitable overflow outlet 15 when multiple water sources are utilized.

Figure 2:
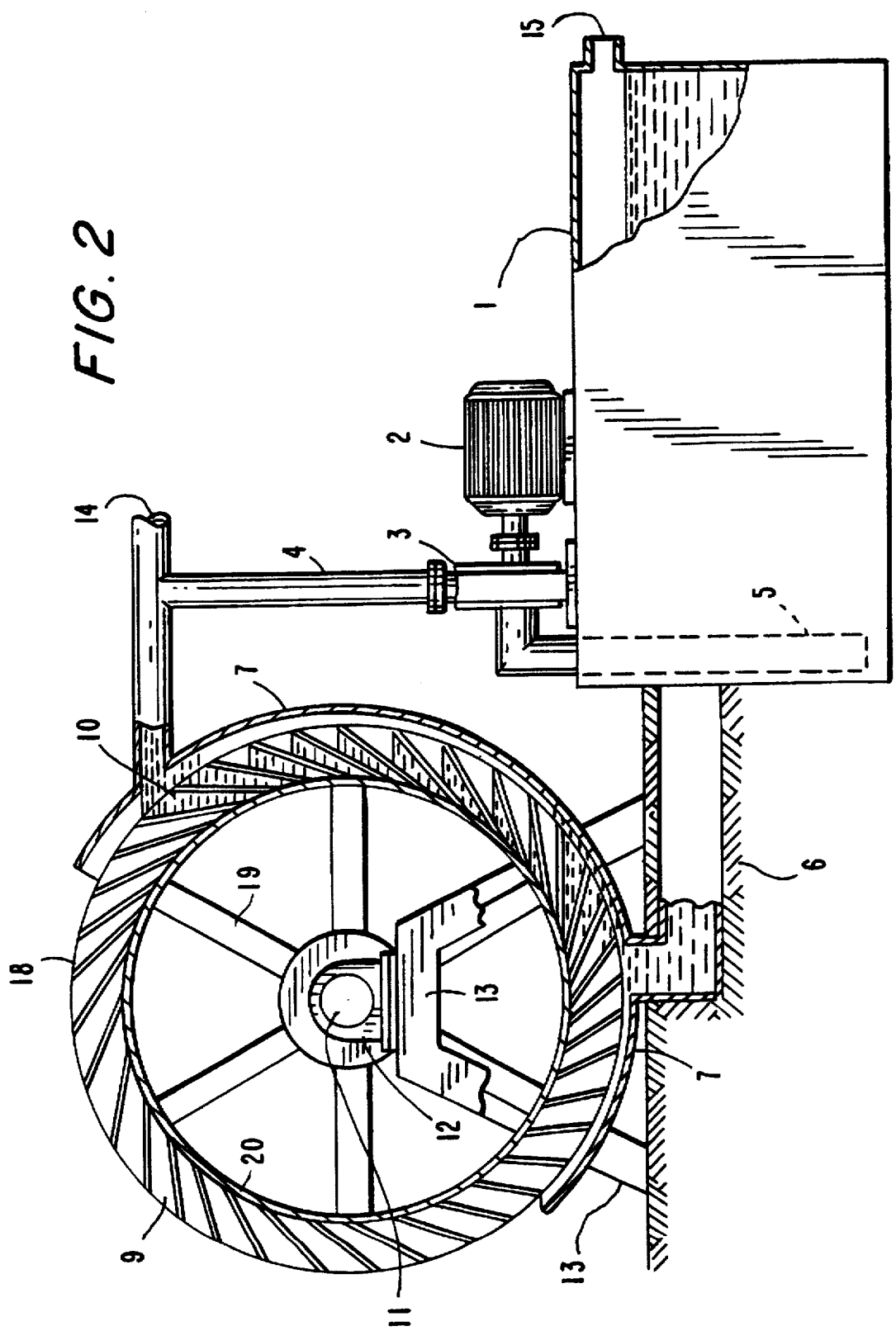
FIG. 2 is a side elevation view of the embodiment set forth in FIG. 1.

The buckets 9 of the waterwheel are designed to receive and maintain a maximal amount of water as they pass the entryway 21 of the pipe 4. The buckets are formed with a common inner cylindrical wall 20, which is mounted to and supported by the arms 19. Each of the buckets includes a pair of generally radially-directed vanes or impeller block elements 16, forming both the top of a first bucket and the bottom of the adjacent bucket. The side walls of the buckets are formed from the parallel side walls 17 of the turbine (FIG. 1), the bucket vanes being welded or otherwise sealed to the turbine side walls to provide leak-free receptacles for the water. In side view, each of the buckets or receptacles is of generally trapezoidal shape, the open, distal end 18 being rectangular and of greater area than the generally rectangular inner end formed from a portion of the common inner cylindrical turbine wall 20. As seen in FIG. 2, the vanes are oriented at an angle to the radius of the turbine wheel such that a bucket is oriented generally vertically, with its open end upward, as it passes the water entryway 21, allowing the bucket to be completely filled.

In order to maintain the maximum amount of water in the buckets as the turbine wheel rotates, notwithstanding the varying orientation of the open mouths 18 of the buckets during rotation, the turbine is provided with a fixed curved wall 7 positioned adjacent the periphery of the wheel and extending from a location proximate the top of the wheel in excess of 180° about the wheel, terminating at a point beyond the exitway 22 and pipe 6. The curved wall is oriented and positioned directly adjacent to the distal ends 18 of the buckets, and provides a generally sealing relationship with the open ends thereof, resulting in the retention of the water in the buckets during their rotation from the time of fill from entryway 21 to the time of discharge through exitway 22. In a preferred embodiment, there is no physical contact between the curved frame wall and the buckets, yet the positioning of the frame wall with respect to the open ends of the buckets is such that minimal leakage results therebetween.

In operation, water from the well 1 and/or a second source is directed through entryway 21 to the turbine wheel. A bucket 9 adjacent the entryway is accordingly filled. As a bucket fills, the added mass to the turbine wheel creates state of imbalance about the shaft 11. As the shaft and wheel are free to rotate about the bearings 12, the imbalance causes a net clockwise rotational force to be generated. As the wheel rotates, a subsequent bucket passes the entryway, where it is filled, adding to the net imbalance and thus rotational force.

As each bucket passes the entryway in a generally upright orientation, it can be fully filled by the inflowing water. Even though during subsequent rotation its orientation changes, the adjacent sidewall 7 prevents any substantial draining of the bucket. This maximizes the imbalance of the wheel, and maximizes the rotational force available at the shaft.

The exitway 22 through the sidewall 7 located at the bottom of the turbine allows the water captured in a bucket to drain from the turbine before the bucket passes the vertical centerline of the wheel. The drained water is delivered by the pipe 6 to the well 15, where it is stored for return to the turbine entryway by pump 3. Once the quantity of water in the well reaches an appropriate level, as defined by the overflow outlet 15, additional water drained from the turbine passes out through the outlet. By operating the pump drive motor 2 as required, the total water flow into the turbine, and thus its rotational output, can be controlled over a range of water flow rates from the second, typically natural, source, thus insuring a constant source of turbine energy over a variety of conditions.

I claim:

1. A water turbine apparatus, comprising an upright rotating waterwheel journaled for rotation about a horizontal axis coupled to an output shaft, said waterwheel having a plurality of water-receiving buckets positioned about an outer periphery thereof; delivery means for supplying water to said buckets seriatim at a location proximate the top of the waterwheel; an exit means for draining water from said buckets at the bottom of the waterwheel, said buckets being of a generally trapezoidal shape in cross-section and having opposed first and second ends, said first end being open for the receipt of water, said buckets being arrayed around said outer periphery in an orientation whereby a first open end of a bucket is directly above the second end of the bucket when the bucket is adjacent said delivery means for fill thereby; and cover means fully surrounding the outer periphery of said waterwheel between said delivery means at the top of the waterwheel and said exit means at the bottom of the waterwheel for retaining water in said buckets during the rotation of said buckets from said location proximate the top to the bottom of the waterwheel, said delivery means and exit means each comprising a conduit mounted to said cover, said cover extending about the outer periphery of the waterwheel past said delivery means and exit means.

2. The apparatus of claim 1 wherein said cover means comprise a fixed wall positioned adjacent open ends of said water buckets.

3. The apparatus of claim 1, wherein said first end is of greater cross-sectional area than said second end.

4. The apparatus of claim 1, wherein said delivery means comprises a water inlet at said upper location, a water reservoir, and a pump for delivering water from said reservoir to said inlet.

5. The apparatus of claim 4, wherein said exit means comprises a water passageway from said lower location to said reservoir.

6. The apparatus of claim 1, wherein said delivery means comprises first and second inlets at said upper location, said first inlet being coupled to a natural water supply, said second inlet being coupled to a pump for selectively supplying water to said delivery means from a reservoir whereby the supplied water to the waterwheel can be maintained at a controlled flow rate irrespective of variation in flow from said natural water supply.

* * * * *